Patented May 11, 1937

2,079,616

UNITED STATES PATENT OFFICE 2,079,616

RESINOUS COATING COMPOSITIONS

Horace H. Hopkins, Springfield, Henry Lyne Plummer, Philadelphia, and Leslie Field Stone, Rutledge, Pa., assignors to E. I. du Pont de Nemours & Company, Wilmington, Del., a corporation of Delaware No Drawing. Application July 24, 1933, Serial No. 682,040

4 Claims. (Cl. 260—4)

This invention relates to coating compositions, and more particularly to compositions made from synthetic resins and ingredients used in the manufacture of such resins.

Resins of the phenol-aldehyde type made by reacting a suitable phenol with formaldehyde, or other aldehyde, and polyhydric alcohol-polybasic acid resins, usually used in the form of glyceryl phthalate resins made by heat treatment of glycerol and phthalic anhydride with or without certain other modifying ingredients have been known for a long time, and both have found quite extensive use in the preparation of coating compositions. Each has its own peculiar advantages and disadvantages. Each has been used modified with quite a wide variety of other ingredients in order to overcome some of its defects.

The polyhydric alcohol-polybasic acid resins and their modifications on one hand have the disadvantage of being thermoplastic, somewhat water and alkali sensitive, and deficient in hardness and strength. With the phenol-formaldehyde resins, on the other hand, only certain types may be used to prepare oleoresinous coating compositions, since a great many phenol-formaldehyde resins cannot be heat blended with drying oils or with drying oil constituents. Coating compositions prepared from oleoresinous phenol formaldehyde combinations have the disadvantage of being difficult to manufacture, since many of them are very readily heat convertible and go over to the insoluble infusible stage before they have become thoroughly incorporated. The film laid down is apt to be excessively hard and brittle, and many of these films discolor very badly on exposure to the light, heat, etc. The oleoresinous materials made from phenol-aldehyde combinations are also in many cases only sparingly soluble in the common solvents and have the additional disadvantage of being quite high in price. They have the very decided advantage, however, of being remarkably resistant to water and alkali and of possessing hardness and strength which cannot be secured with other common types of coating compositions.

Numerous attempts have been made to eliminate the disadvantages of each resin by combining it with the other. Some of these methods involve a more or less physical combination of the resins by directly incorporating certain oil soluble phenol-formaldehyde resins into oil modified polyhydric alcohol-polybasic acid resins through heat treatment. Other and more satisfactory methods involve the synthesis of one resin in the presence of the other, or of the synthesis of the final product by simultaneously reacting the ingredients used in making both types of the resins mentioned above. Of these methods, there may be mentioned those in which glycerol and phthalic anhydride are reacted either in the presence of a phenolic resin or in the presence of the ingredients used in the synthesis of the latter resins; both of these methods using monobasic acids, particularly drying oil acids, with the glyceryl and phthalic anhydride reactants in order to obtain the properties desired in the resulting composition.

Oleoresinous compositions prepared in the manner just described have, however, certain disadvantages. They are limited in the matter of composition inasmuch as the amount of phenolic resin cannot satisfactorily exceed 50% by weight of the composition of the mixture. These compositions are also sometimes poor from a drying standpoint and the phenol-aldehyde resin appears to inhibit the normal oxidation of the oil constituents present.

This invention has as an object the production of new and useful coating compositions. A further object is an improved process for producing, from phenolic resins, polyhydric alcohol-polybasic acid, and fatty oils or their equivalents, resinous compositions which are free from the disadvantages of the prior art compositions referred to above. Other objects will appear hereinafter.

In carrying out our invention, we first heat an oil soluble phenolic resin with drying oil in the manner commonly used in varnish preparation and when the reaction which takes place between the resin and oil has progressed to the desired extent, the product is heated in the presence of a basic catalyst with all or a major part of the glycerol which is used in the present process. The heating is continued until the chemical action is completed, as will be apparent by the merging of the two liquid phases into a single phase. Phthalic anhydride, substantially equivalent to the total amount of glycerol (phthalic anhydride to glycerol should be substantially 3 moles to 2 moles, the total amount of both depending upon the amount of phthalic glyceride desired in the resin), is then added to the alcoholized varnish and the mixture heated to the desired degree of condensation. If the total amount of glycerol has not been used in the first mentioned instance, the remaining glycerol is added following the addition of the phthalic anhydride. The source of heat is cut off and the material in the kettle thinned in the manner customary with such solutions. It is usually desirable to add drying oil with the first addition of glycerol so that the composition will contain a substantial proportion of drying oil in addition to the drying oil which has been combined with the phenolic resin in the first step of the process.

The method of carrying out our invention is illustrated more specifically by the following examples in which the proportions are in parts by weight:

Example I

| | Parts |
|---|---|
| Phenol-aldehyde resin | 72.5 |
| China-wood oil | 289.0 |
| Linseed oil | 289.0 |
| Glycerine (dynamite grade) | 102.5 |
| Litharge | .6 |
| Phthalic anhydride | 247.0 |
| Hi-flash naphtha | 245.14 |
| | 1245.74 |

The above ingredients are combined in the following manner: The oil soluble phenol-aldehyde resin and the China wood oil are heated fairly rapidly to 450° F. and held at that temperature for twenty minutes. 285 pounds of linseed oil and 102 pounds of glycerine are then added and agitation started. The litharge is made into a slurry with four pounds of linseed oil and added to the mixture. Fairly vigorous agitation is maintained. The temperature is then raised to 437° F. and held until the mixture is clear and homogeneous. This takes about thirty minutes. 247 pounds of phthalic anhydride are then added and heat applied until the temperature again reaches 437° F. The batch is held at this temperature until a viscosity of a 60% solution of the mixture in Hi-flash naphtha is from O to P at 25° C. on the Gardner-Holdt scale. About three hours' time is required for this last step. When the desired viscosity is reached, the mixture is thinned with 245.14 pounds of Hi-flash naphtha. The material so obtained is a base varnish which may be thinned with other common thinners as desired and to which the ordinary liquid driers may be added.

Example II

| | Parts |
|---|---|
| Phenol-aldehyde resin | 64.0 |
| China-wood oil | 578.5 |
| Linseed oil | 125.0 |
| Glycerol (dynamite grade) | 67.5 |
| Litharge | .7 |
| Linseed oil | 4.0 |
| Phthalic anhydride | 162.0 |
| Thinner (50–50 mixture Hi-flash naphtha and mineral spirits) | 223.08 |
| Liquid manganese drier | 24.0 |
| | 1248.78 |

The above materials are combined in the same manner as those of Example I. The batch is held at 437° F. until a viscosity of E at 25° C. on the Gardner-Holdt scale is obtained on a 50% solution in the thinned mixture. The manganese drier is added with the thinner at the end of the operation. This base varnish gives films which are somewhat more flexible than those of the preceding example.

Example III

| | Parts |
|---|---|
| Phenol-aldehyde resin | 48.0 |
| China-wood oil | 190.0 |
| Linseed oil | 291.0 |
| Glycerol (dynamite grade) | 102.0 |
| Linseed oil | 4.0 |
| Litharge | .5 |
| Phthalic anhydride | 330.0 |
| Glycerol | 35.0 |
| Hi-flash naphtha | 245.14 |
| | 1245.64 |

The above ingredients are combined in the following manner: The oil soluble phenol-aldehyde resin and the China-wood oil are heated to 450° F. in a short time and held at that temperature for fifteen minutes. 291 pounds of linseed oil, 102 pounds of glycerol are then added. The cover is placed upon the kettle and agitation started. Heat is applied until the temperature rises to 437° F. Four pounds of linseed oil mixed with 0.5 part litharge are then added and the temperature held at 437° F. until the mixture is clear and homogeneous. This takes about thirty minutes. The phthalic anhydride is then added and the temperature raised to 437° F. When this temperature is reached, the remaining glycerol, 136 pounds, is added. The temperature is held at 437° F. for one hour and then dropped to 392° F. It is held at this temperature until a solution in Hi-flash naphtha containing 60% of the kettle mixture has a viscosity at 25° C. of about W on the Gardner-Holdt scale. The mixture is then thinned with 245.14 parts of Hi-flash naphtha. This gives a varnish which will dry somewhat more rapidly than those of the preceding examples.

In the foregoing examples, the linseed oil, or other drying oil, is incorporated after the heat treatment of the phenolic resin and oil in the first step. A portion of the drying oil which is added later may, however, be included in the first step. We have found that more satisfactory incorporation of additional oil is usually obtained by the use of China-wood oil alone in the first step.

All of the glycerol may be added in the first step if desired, although this is not the preferred procedure. For satisfactory commercial practice, a basic catalyst, such as a basic oxide or hydroxide, should be used in reacting the glycerol and the product obtained by heating the phenolic resin and drying oil. Suitable catalysts other than litharge are sodium, barium, sodium glycerate, lime, etc.

The phenol-aldehyde resins used in the practice of our invention are the oil soluble resins available to the trade and made by the known methods. Hydroxydiphenyl-formaldehyde resin was the one used in the preceding examples. We have found this to be a very satisfactory resin of this type. Others may be made by condensing with formaldehyde certain phenols such as p',p'-dihydroxydiphenyl, tertiary-amyl phenol, tertiary-heptyl phenol, di(4-hydroxy-3-methylphenyl)dimethylethane, di(4-hydroxy-3-chlorophenyl)dimethylmethane, etc., or other phenols which produce the relatively hard phenol-aldehyde condensation products now on the market and which are soluble on heating with drying oils. The polyhydric alcohols and polybasic acids used in the practice of our invention are those used in the manufacture of polyhydric alcohol-polybasic acid resins. Instead of glycerol, we may use glycol, diethylene glycol, diglycerol, pentaerythritol, monoethylin, mannitol, monobenzylin, etc. Suitable polybasic acids, in addition to phthalic anhydride, are maleic, succinic, sebacic, adipic, malic, citric, tartaric, dilactylic, diphenic, naphthalic, quinolinic, etc., or their anhydrides. Drying oil may be linseed, Chinawood, perilla, hempseed, walnut, oiticica, pecan, safflower, sunflower, rubberseed, etc. Instead of formaldehyde, we may use p-formaldehyde, methylene chloride, hexamethylenetetramine, benzaldehyde, acetaldehyde, etc. Monomeric formaldehyde is usually the most satisfactory.

The operations described above can be satisfactorily carried out in an ordinary varnish kettle. It is desirable, however, to have a tight fitting cover and a short reflux condenser to retain the small amount of glycerol which is vaporized.

Our improved product is particularly valuable in the preparation of binders for the abrasive used in the manufacture of waterproof sand paper. It is also useful generally where varnishes of the present type are desired which have unusual resistance to water and alkali.

The product made as described above has marked advantages over the previously used compositions made from oil soluble phenolic resins, polyhydric alcohol and polybasic acid. A wide latitude is possible in the amount of the phenolic resin which can be contained in the composition. Satisfactory compositions may be made which contain substantially more than 50% by weight of the phenol-aldehyde resin. Our new composition is definitely superior to the polyhydric alcohol-polybasic acid resin in water and alkali resistance and the films are harder and stronger than those prepared from these resins. The films of our oleoresinous coating compositions do not yellow or discolor on exposure to the same extent as is common with the resins of the oil modified phenol-formaldehyde type. The films of our compositions are free from the tendency to become excessively hard and brittle as do the oil modified phenol-formaldehyde materials now in use. Our composition is easier to manufacture than the coating compositions commonly prepared which contain phenol-formaldehyde condensation products.

As many apparently widely different embodiments may be made without departing from the spirit and scope of our invention, we do not limit ourselves to the specific embodiments thereof except as defined in the following claims.

We claim:
1. A process which comprises heating polyhydric alcohol in the presence of basic catalyst with the varnish obtained by heating drying oil with oil soluble phenol-aldehyde resin, continuing said heating until the two phases merge into a single phase, and heating the resulting product with polycarboxylic acid until the desired degree of condensation has occurred.

2. A process which comprises heating drying oil with oil soluble phenol-formaldehyde resin, heating the varnish thus obtained with polyhydric alcohol until the two liquid phases merge into a single phase, adding polycarboxylic acid and additional polyhydric alcohol and heating the product until the desired degree of condensation has occurred, the amount of polycarboxylic acid being substantially chemically equivalent to the total amount of polyhydric alcohol.

3. The process set forth in claim 1 in which the polyhydric alcohol is glycerol and the polybasic acid is phthalic anhydride.

4. The process set forth in claim 2 in which the polyhydric alcohol is glycerol and the polybasic acid is phthalic anhydride.

HORACE H. HOPKINS.
HENRY LYNE PLUMMER.
LESLIE FIELD STONE.

CERTIFICATE OF CORRECTION.

Patent No. 2,079,616.                                                May 11, 1937.

HORACE H. HOPKINS, ET AL.

It is hereby certified that error appears in the printed specification of the above numbered patent requiring correction as follows: Page 2, second column, line 67, for "dimethylethane" read dimethylmethane; and that the said Letters Patent should be read with this correction therein that the same may conform to the record of the case in the Patent Office.

Signed and sealed this 29th day of June, A. D. 1937.

Henry Van Arsdale
Acting Commissioner of Patents.

(Seal)

we may use glycol, diethylene glycol, diglycerol, pentaerythritol, monoethylin, mannitol, monobenzylin, etc. Suitable polybasic acids, in addition to phthalic anhydride, are maleic, succinic, sebacic, adipic, malic, citric, tartaric, dilactylic, diphenic, naphthalic, quinolinic, etc., or their anhydrides. Drying oil may be linseed, Chinawood, perilla, hempseed, walnut, oiticica, pecan, safflower, sunflower, rubberseed, etc. Instead of formaldehyde, we may use p-formaldehyde, methylene chloride, hexamethylenetetramine, benzaldehyde, acetaldehyde, etc. Monomeric formaldehyde is usually the most satisfactory.

The operations described above can be satisfactorily carried out in an ordinary varnish kettle. It is desirable, however, to have a tight fitting cover and a short reflux condenser to retain the small amount of glycerol which is vaporized.

Our improved product is particularly valuable in the preparation of binders for the abrasive used in the manufacture of waterproof sand paper. It is also useful generally where varnishes of the present type are desired which have unusual resistance to water and alkali.

The product made as described above has marked advantages over the previously used compositions made from oil soluble phenolic resins, polyhydric alcohol and polybasic acid. A wide latitude is possible in the amount of the phenolic resin which can be contained in the composition. Satisfactory compositions may be made which contain substantially more than 50% by weight of the phenol-aldehyde resin. Our new composition is definitely superior to the polyhydric alcohol-polybasic acid resin in water and alkali resistance and the films are harder and stronger than those prepared from these resins. The films of our oleoresinous coating compositions do not yellow or discolor on exposure to the same extent as is common with the resins of the oil modified phenol-formaldehyde type. The films of our compositions are free from the tendency to become excessively hard and brittle as do the oil modified phenol-formaldehyde materials now in use. Our composition is easier to manufacture than the coating compositions commonly prepared which contain phenol-formaldehyde condensation products.

As many apparently widely different embodiments may be made without departing from the spirit and scope of our invention, we do not limit ourselves to the specific embodiments thereof except as defined in the following claims.

We claim:

1. A process which comprises heating polyhydric alcohol in the presence of basic catalyst with the varnish obtained by heating drying oil with oil soluble phenol-aldehyde resin, continuing said heating until the two phases merge into a single phase, and heating the resulting product with polycarboxylic acid until the desired degree of condensation has occurred.

2. A process which comprises heating drying oil with oil soluble phenol-formaldehyde resin, heating the varnish thus obtained with polyhydric alcohol until the two liquid phases merge into a single phase, adding polycarboxylic acid and additional polyhydric alcohol and heating the product until the desired degree of condensation has occurred, the amount of polycarboxylic acid being substantially chemically equivalent to the total amount of polyhydric alcohol.

3. The process set forth in claim 1 in which the polyhydric alcohol is glycerol and the polybasic acid is phthalic anhydride.

4. The process set forth in claim 2 in which the polyhydric alcohol is glycerol and the polybasic acid is phthalic anhydride.

HORACE H. HOPKINS.
HENRY LYNE PLUMMER.
LESLIE FIELD STONE.

CERTIFICATE OF CORRECTION.

Patent No. 2,079,616.            May 11, 1937.

HORACE H. HOPKINS, ET AL.

It is hereby certified that error appears in the printed specification of the above numbered patent requiring correction as follows: Page 2, second column, line 67, for "dimethylethane" read dimethylmethane; and that the said Letters Patent should be read with this correction therein that the same may conform to the record of the case in the Patent Office.

Signed and sealed this 29th day of June, A. D. 1937.

Henry Van Arsdale
Acting Commissioner of Patents.

(Seal)

CERTIFICATE OF CORRECTION.

Patent No. 2,079,616.                                    May 11, 1937.

HORACE H. HOPKINS, ET AL.

It is hereby certified that error appears in the printed specification of the above numbered patent requiring correction as follows: Page 2, second column, line 67, for "dimethylethane" read dimethylmethane; and that the said Letters Patent should be read with this correction therein that the same may conform to the record of the case in the Patent Office.
Signed and sealed this 29th day of June, A. D. 1937.

(Seal)

Henry Van Arsdale
Acting Commissioner of Patents.